Jan. 26, 1960    F. F. HALL    2,922,662
HYDRAULIC HOSE LINE COUPLINGS
Filed Dec. 16, 1957    2 Sheets-Sheet 1

Fred F. Hall
INVENTOR.

BY *Clarence A. O'Brien*
*and Harvey B. Jacobson*
Attorneys

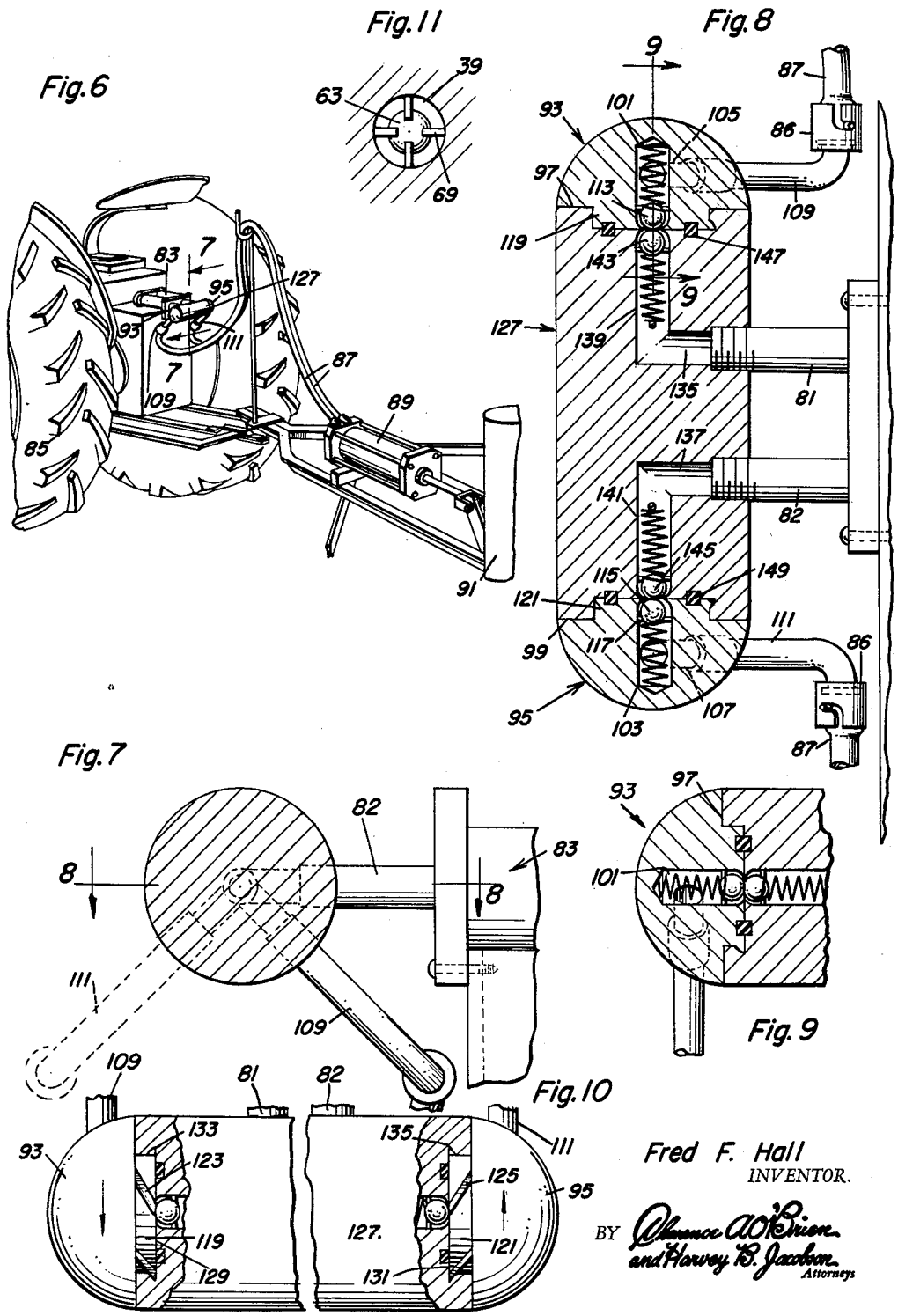

United States Patent Office 2,922,662
Patented Jan. 26, 1960

2,922,662

HYDRAULIC HOSE LINE COUPLINGS

Fred F. Hall, Belle Fourche, S. Dak.

Application December 16, 1957, Serial No. 703,040

2 Claims. (Cl. 284—4)

My invention relates to improvements in hose line couplings for the hydraulic systems of tractors and trailers.

The primary object of my invention is to provide a hose line coupling for the above purpose which embodies a pair of coupling members and screw thread means for connecting said members and quickly disconnecting the same when the tractor is uncoupled from the trailer and pulls away from the same.

Another object is to provide a hose line coupling as in the foregoing which is safe, will not waste the hydraulic fluid and is simple in construction and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a fragmentary view in perspective of a second embodiment of my coupling for connecting the hydraulic lines of a farm tractor to the hydraulic lines of a trailing agricultural implement;

Figure 7 is an enlarged view in vertical transverse section taken on the line 7—7 of Figure 6;

Figure 8 is a view in horizontal section taken on the line 8—8 of Figure 7;

Figure 9 is a fragmentary view in longitudinal section taken on the line 9—9 of Figure 8;

Figure 10 is an enlarged plan view partly in section and partly broken away of the embodiment shown in Figure 6; and Figure 11 is a fragmentary view in vertical transverse section taken on the line 11—11 of Figure 2.

Figure 1:
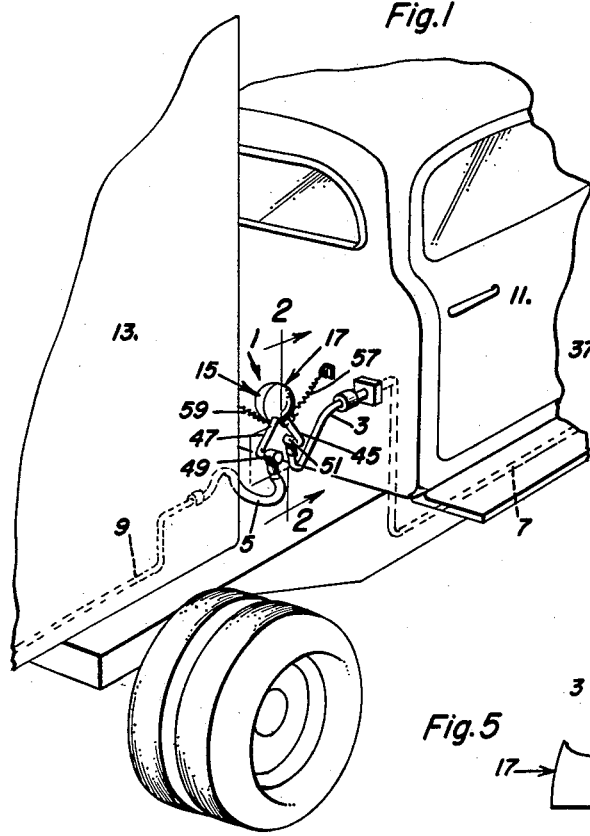
Figure 1 is a fragmentary view in perspective of a first embodiment of my coupling in which a pair of coupling members connect the hydraulic hose lines of a tractor and semi-trailer.

Referring to the drawings by numerals, and first to the first embodiment of my coupling shown in Figures 1 to 5 and in which the coupling designated generally by the numeral 1 serves to couple together hydraulic hose lines 3 and 5 from the hydraulic systems shown generally at 7, 9 of a tractor 11 and semi-trailer 13. The coupling 1 comprises as its basic components a pair of semi-spherical coupling members 15, 17 having confronting diametrical side faces 19, 21 provided with the following means for connecting the members together.

The member 15 has formed in its face 19 a concentric annular socket 23 provided with internal quadruple, female screw threads 25 in 90° angular relation, whereas, the member 17 has formed on its face 21 an outwardly projecting annular flange 27 adapted to fit in the socket 23 and provided with circumferential male, quadruple screw-threads 29 in 90° angular relation for mating with the screw threads 25, to screw said members 15, 17 together with their faces 19, 21 engaging. The threads 25, 29 are left hand and pitched so that a quarter turn of either member 15, 17 relative to the other in opposite directions will tightly screw said members 15, 17 together or unscrew the same for separation. A sealing gasket 31 is recessed concentrically as at 33 in the face 19 of the member 15 to seat in an annular recess 35 in the face 21 of the member 17.

Means is provided for passing fluid under pressure through the connected members 15, 17 comprising the following. A pair of axial blind bores 37, 39 are provided in the members 15, 17 which extend into the same from the faces 19, 21 into communication when said members 15, 17 are connected and which open at their rear ends into angular branch bores 41, 43 in the members 15, 17 communicating with a pair of pipes 45, 47 depending from the members 15, 17 with inner ends 48, 50 threaded into outer ends of the branch bores 41, 43.

The pipes 45, 47 form levers movable manually toward each other to rotate the members 15, 17 relatively in a direction to screw the flange 27 into the socket 23 and thereby connect said members, or movable apart to rotate said members relatively in a direction to unscrew the flange 27 so that the members 15, 17 are disconnected and will fall apart.

Figure 2:
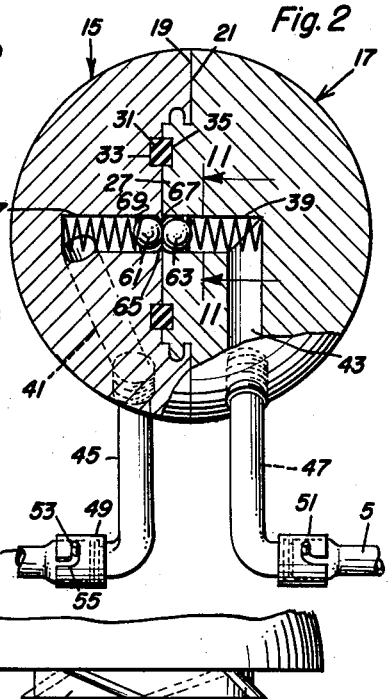
Figure 2 is an enlarged view in vertical section taken on the line 2—2 of Figure 1.
Figure 5:
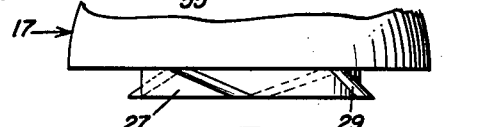
Figure 5 is a fragmentary view in plan of one of the members.
Figure 3:
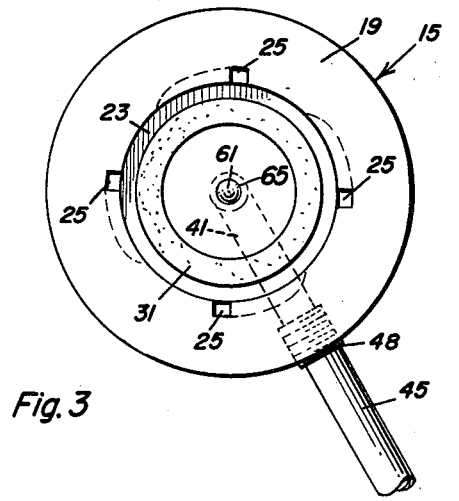
Figure 3 is an enlarged view in front elevation of one of the members.
Figure 4:
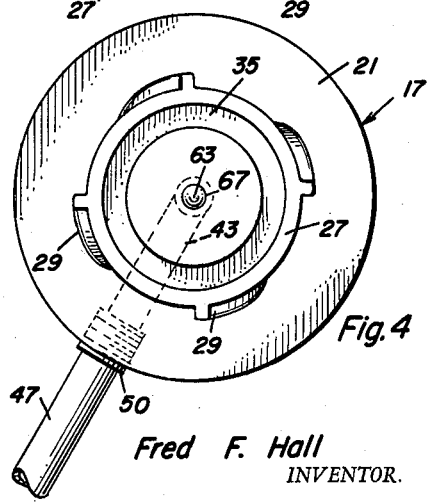
Figure 4 is an enlarged view in front elevation of the other member.

The pipes 45, 47 are terminally connected to the hose lines 3, 5 by swivel couplings 49, 51 in which the line is detachably fixed as shown in Figure 2 by a pin and bayonet slot connection 53, 55. A pair of light coil springs 57, 59 suitably terminally connected to the tractor 11 and trailer 13 and to the pipes 45, 47 floatingly suspend the coupling 1 in vertical position with the pipes 45, 47 lowermost.

Spring loaded ball valve members 61, 63 in the bores 37, 39 engage seats 65, 67 in the bores 37, 39 at the faces 19, 21 when the members 15, 17 are disconnected to prevent leakage of hydraulic fluid out of said members. The valve members 61, 63 are engaged and thereby pressed inwardly of the bores 37, 39 into unseated pin position in response to screwing of the flange 27 into the socket 23 which is to say in response to connection of said members. Radial lugs 69 in the bores 37, 39 as best shown in Figure 11 center each ball valve member 61 or 63 in its bore 37, 39 in fluid passing position when opened, it being of course understood that the ball valve members 61, 63 are smaller in diameter than the bores 37, 39.

The operation of the first embodiment of the coupling will be readily understood. The hose lines 3, 5 are coupled to the pipes 45, 47 and the members 15, 17 then connected by screwing the flange 27 and socket 23 together by rotation of the members 15, 17 clockwise and counterclockwise, respectively, as viewed in Figure 1. When and if the tractor 11 pulls away from the trailer 13, the pull of the hose lines 3, 5 will pull the pipes 47, 45 away from each other to unscrew the flange 27 and socket 23 whereupon the members 15, 17 will fall apart but be suspended by the springs 59, 57. In response to unscrewing of the flange 27 and socket 23, and disconnection of the members 15, 17 the ball valve members 61, 63 will seat and close the bores 37, 39 and said members.

The second embodiment of the coupling shown in Figures 6 to 10 connects dual rigid hydraulic lines 81, 82 of the hydraulic system, indicated at 83, of a farm tractor 85 to dual hose lines 87 of the hydraulic system, indicated generally at 89, of a trailer 91 such as a farm implement.

In the second embodiment, a pair of semi-spherical coupling members 93, 95 similar to the coupling members 15, 17 in that said members 93, 95 have diametrical side faces 97, 99, respectively and said members 93, 95 are provided with valved means for passing hydraulic fluid therethrough comprising axial blind bores 101, 103 extending inwardly from the faces 97, 99, respectively, said bores 101, 103 opening at their rear ends into angular branch bores 105, 107 in said members 93, 95, respectively, communicating with a pair of pipes 109, 111 adapted to depend from said members as in the first embodiment to form levers and be coupled to the hose lines 87 by couplings 86 corresponding to the couplings 51, 53.

The bores 101, 103 are provided therein with spring loaded ball valve members 113, 115 for closing the outer ends of the bores 101, 103 and with radial legs 117 as and for the purpose set forth in connection with the first embodiment. The members 93, 95 are provided with concentric annular flanges 119, 121 provided with male quadruple threads, the threads 123 on the flange 119 being left hand threads, whereas, the threads 125 on the flange 121 are right hand threads as shown in Figure 10. The flanges 119, 121 and threads 123, 125 form part of means for connecting the coupling members 93, 95 and which further comprises the following.

A fixed intermediate cylindrical coupling member 127 is mounted horizontally, as presently described transversely of the tractor 85. The member 127 is provided with end sockets 129, 131 provided with internal female threads 133, 135 complemental to and into which the flanges 119, 121 may be turned by rotating the members clockwise and counterclockwise, respectively, as viewed in Figures 6 and 10 and indicated by the arrows in Figure 10.

The coupling member 127 is provided with valved means for passing hydraulic fluid therethrough to the members 93, 95. This means comprises a pair of radial bores 135, 137 in said member 127 into which the hydraulic pipe lines 81, 82 are threaded to mount said member 127. The bores 135, 137 open into a pair of axial bores 139, 141 in the member 127 communicating with the bores 101, 103 respectively. The bores 139, 141 are provided therein with spring loaded valve members 143, 145 like the valve members 113, 115 normally seating to close said bores 139, 141 at the outer ends thereof.

The ball valve members 113, 143 and 115, 145 are engaged when the members 93, 95 are connected to the member 127 whereby to unseat into open position as described with reference to the ball valve members 61, 63 and the ball valve members 113, 115 automatically close the bores 101, 103 while the ball valve members 143, 145 automatically close the ports 139, 141 in response to unscrewing of the flanges 119, 121 from the sockets 129, 131 which is to say in response to disconnection of the members 93, 95 from the member 127.

The dual hose lines 87 are connected to the pipes 109, 111 in the same manner and by the same means as described with reference to the hose lines 3, 5 and pipes 45, 47.

In the operation of the described second embodiment of the coupling, the members 93, 95 are connected by rotating member 93 clockwise and the member 95 counterclockwise as viewed in Figures 6 and 10 to screw the flanges 119, 121 tight into the sockets 129, 131 and when said members 93, 95 are thus connected by the member 127 the pipes 109, 111 are in depending forwardly and downwardly slanting position, as shown in Figure 6 and so that when the tractor 85 pulls away from the trailer 91 the members 93, 95 will be simultaneously unscrewed to fall away from the member 127. In response to such disconnection of said members 93, 95 from the member 127, the ball valve members 113, 115 will seat and close members 93, 95 and the ball valve members 143, 145 will also seat and close the member 127.

Sealing gaskets 147, 149 corresponding to gasket 31 may be provided between the sockets 129, 131 and the flanges 119, 121.

As will be understood the members 93, 95 are connected and disconnected by a quarter turn as in the first described embodiment, the threads 123, 133, and 125, 135 being pitched for that purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A coupling for connecting together hydraulic lines of a tractor and trailer comprising a pair of opposite coupling members having confronting faces, screw thread means on said confronting faces rotatably connecting said members together and pitched at an angle of 45° for disconnection of said members from each other to fall apart in response to a quarter rotation of said members in opposite directions, a pair of pipes fixed to and extending from said members respectively, normal to the axis of rotation of the members and in side-by-side relation for pull thereon away from each other to rotate said members, terminal means on said pipes for coupling the pipes to said hydraulic lines, respectively, whereby to exert pull on said pipes in response to pulling of the tractor away from the trailer, a pair of ports in said members respectively communicating at said confronting faces and with the pipes of said pairs respectively, for passing hydraulic fluid from one line through said members and pipes to the other line, and spring seated normally closed valves in said ports normally unseated and opened in response to connection of said members together.

2. A coupling according to claim 1, said valve members coengaging when said members are connected together to retain the valves unseated when said members are connected together.

References Cited in the file of this patent

UNITED STATES PATENTS

| | | |
|---|---|---|
| 795,069 | Settlage | July 18, 1905 |
| 943,900 | Smith | Dec. 21, 1909 |
| 2,084,842 | Fraser | June 22, 1937 |
| 2,749,146 | Gumbert et al. | June 5, 1956 |
| 2,879,081 | Keehn | Mar. 24, 1959 |